United States Patent [19]
Mueller et al.

[11] Patent Number: 5,099,074
[45] Date of Patent: Mar. 24, 1992

[54] PROCESS FOR THE PREPARATION OF POLYETHER GLYCOLS

[75] Inventors: Herbert Mueller, Frankenthal; Gerhard Jeschek, Gruenstadt; Rolf Fischer, Heidelberg; Hans-Juergen Weyer, Mannheim, all of Fed. Rep. of Germany

[73] Assignee: BASF Aktiengesellschaft, Ludwigshafen, Fed. Rep. of Germany

[21] Appl. No.: 603,519

[22] Filed: Oct. 26, 1990

[30] Foreign Application Priority Data

Nov. 14, 1989 [DE] Fed. Rep. of Germany ....... 3937797

[51] Int. Cl.$^5$ ................... C07C 41/02; C07C 43/11; C07C 43/13
[52] U.S. Cl. .................................... 568/617; 568/622
[58] Field of Search ........................................ 568/617

[56] References Cited

U.S. PATENT DOCUMENTS

| 4,500,705 | 2/1985 | Copelin | 528/417 |
| 4,568,775 | 2/1986 | Aoshima et al. | 568/617 |
| 4,638,097 | 1/1987 | Mueller | 568/617 |
| 4,658,065 | 4/1987 | Aoshima et al. | 564/487 |
| 4,677,231 | 6/1987 | Aoshima et al. | 568/617 |
| 4,762,951 | 8/1988 | Mueller | 568/617 |

FOREIGN PATENT DOCUMENTS 0126471 11/1984 European Pat. Off. .
0181621 5/1986 European Pat. Off. .

*Primary Examiner*—Howard T. Mars
*Assistant Examiner*—Rebecca Cook
*Attorney, Agent, or Firm*—John H. Shurtleff

[57] ABSTRACT

A process for the preparation of polyether glycols by polymerization of tetrahydrofuran or copolymerization of tetrahydrofuran with oxiranes in the presence of from 20 to 500% w/w of a hydrocarbon, based on the weight of tetrahydrofuran used.

9 Claims, No Drawings

PROCESS FOR THE PREPARATION OF POLYETHER GLYCOLS

The present invention relates to a novel process for the preparation of polyether glycols by polymerization of tetrahydrofuran or copolymerization of tetrahydrofuran with oxiranes in the presence of heteropoly acids and hydrocarbons.

Polyether glycols, for example polyoxytetramethylene glycols (referred to below as 'PTMG'), in particular polytetrahydrofuran (referred to below as 'PTHF'), are important starting materials for the preparation of elastic fibers, elastic constructional materials and coatings. They are prepared by polymerization of tetrahydrofuran (referred to below as 'THF') or by copolymerization of THF with oxiranes such as ethylene oxide or propylene oxide in the presence of cationic catalysts. EP-A 0,126,471 describes the use of heteropoly acids as catalysts. This is particularly noteworthy, as the process described produces polyalkylene ether glycols, whilst the polymerization of THF by other methods produces esters of polyalkylene ether glycols, which then have to be hydrolyzed to the polyalkylene ether glycols prior to use in polymer applications.

When THF is polymerized using heteropoly acids, most of the catalyst can be recovered after the reaction by simple phase separation and then recycled to the reaction. However, a by no means negligible portion of the catalyst remains dissolved in the separated polymer solution. It must be completely removed therefrom for reasons of economy and because of the purity demands on the PTMG.

EP-A 0,181,621 describes a method of purifying PTMG solutions contaminated with heteropoly acids. It involves a multi-stage process in which the solutions of PTMG in THF first obtained after polymerization of THF and having a PTMG concentration of, say, 23% w/w are concentrated in a first stage to a PTMG content of approximately 50% w/w by distilling off unconverted THF. A considerable amount of a hydrocarbon is then added and the whole is mixed thoroughly and then allowed to stand for 30 hours to separate the two phases. 50% of the bottom layer consists of the heteropoly acid and the remainder is PTMG, THF and traces of said hydrocarbon. The top layer contains the major portion of the PTMG and is subjected to distillation to remove unconverted THF. The residual mixture of hydrocarbon and PTMG again separates into two layers on cooling. These are a hydrocarbon phase and a phase consisting of PTMG and dissolved hydrocarbon. After removal of the hydrocarbon from the PTMG-containing layer there is finally obtained a PTMG which still contains 50 ppm of heteropoly acid. Since this content of strongly acidic compound cannot be tolerated in the PTMG, the concentration of the heteropoly acid is reduced in a subsequent stage by redissolving the PTMG in a hydrocarbon and treating the solution with an adsorbent such as calcium oxide, magnesium oxide, aluminum oxide, activated charcoal or an activated alumina. This is altogether a very complicated method. It is also very costly, since to remove the catalyst from the polymer about four times as much hydrocarbon must be evaporated following purification (cf. Examples 1 and 15 in EP-A 0,181,621).

The polymerization of THF and other cyclic ethers using heteropoly acids produces polyalkylene ether glycols having a relatively narrow molecular weight distribution. These polymers are particularly suitable for the production of elastic fibers. Due to the difficulty of removing catalyst residues from the polymer, such polyalkylene ether glycols having said favorable molecular weight distribution have not yet achieved significance in large-scale work.

It is thus an object of the present invention to provide means of effecting the polymerization of THF using heteropoly acids more economically. Another, special object is to provide a way of continuously preparing polyalkylene ether glycols having a narrow molecular weight distribution. Yet another object is to reduce the energy requirements.

We have now found that the favorable results desired in the preparation of polyether glycols by polymerization of THF or copolymerization of THF with oxiranes using a heteropoly acid as catalyst are obtained when the said polymerization is carried out in the presence of from 20 to 500% w/w of a hydrocarbon, based on the weight of THF used.

Surprisingly, the process of the invention increases both the rate and the degree of polymerization, which could not have been foreseen. Since the rate of polymerization is influenced by the concentration of monomer, one would have expected the polymerization to have taken place more slowly due to the dilution effect. The polymerization of THF is an equilibrium reaction which determines the degree of conversion, depending on temperature. In the state of equilibrium, polymerization and depolymerization are balanced within the reaction system. Thus the degree of polymerization of the monomers should not be dependent on any solvent present in the reaction system. Contrary to expectation, however, we have found that polymerization, or copolymerization, of THF in a solvent leads to a higher degree of polymerization than when it is carried out in the absence of solvent.

The polymerization of THF or copolymerization of THF with oxiranes such as ethylene oxide or propylene oxide using heteropoly acids as catalysts is carried out in conventional manner, as described in, EP-A 126,471.

Heteropoly acids, as used in the process of the invention, are inorganic poly acids which, unlike isopoly acids, possess at least two central atoms. Heteropoly acids are formed from weak polybasic oxyacids of a metal, e.g. chromium, molybdenum, vanadium or tungsten, or of a non-metal, for example arsenic, iodine, phosphorus, selenium, silicon, boron or tellurium, as partially mixed anhydrides. Examples are dodecatungstophosphoric acid $H_3[PW_{12}O_{40}]$ and dodecamolybdophosphoric acid $H_3[PMo_{12}O_{40}]$. Alternatively, the heteropoly acids may contain, as second central atom, actinoids and lanthanoids [cf. Z. Chemie 17 (1977), pp. 353–357, and 19 (1979), 308]. Heteropoly acids may be generally represented by the formula $H_{8-n}(Y^nM_{19}O_{40})$, where n is the valency of the element Y (e.g. boron, silicon, zinc) (cf. *Heteropoly-und Isopoly-oxometalates*, Berlin; Springer 1983). Particularly suitable heteropoly acids for use as catalysts in the process of the invention are tungstophosphoric acid, molybdophosphoric acid, molybdosilicic acid and tungstosilicic acid.

In general, one molecule of heteropoly acid binds from twenty to forty molecules of water by a dative bond. The heteropoly acids used as catalysts should contain roughly one to eight molecules of water per molecule of heteropoly acid. The content of water in the heteropoly acid determines the molecular weight of the resulting polymer. The higher the water content of the catalyst, the lower the molecular weight of the polymer formed. The said range of from one to eight molecules per molecule of heteropoly acid corresponds to an average molecular weight of the polyether glycol of from about 1,000 to 3,000.

The hydrocarbons used are aliphatic or cycloaliphatic hydrocarbons containing from 5 to 12 carbon atoms or aromatic hydrocarbons containing from 6 to 10 carbon atoms. Specific examples are pentane, hexane, heptane, octane, decane, cyclohexane, benzene, toluene, xylene and naphthalene, of which cyclohexane, n-hexane, n-heptane and n-octane are preferred. The hydrocarbons are used in an amount ranging from 20 to 500%, preferably from 50 to 200%, by weight of the THF.

Polymerization is carried out continuously or batchwise at a temperature of, from 20° to 100° C. At atmospheric pressure, a temperature of from 35° to 65° C. may be used. If polymerization is carried out under pressure, the temperature may be from 35° to 85° C. The amount of catalyst used is, for example, from 20 to 300 parts by weight for every 100 parts by weight of THF. It is advantageous to use a polymerization reactor equipped with mixing means, e.g. a stirrer. Since polymerization takes place in a two-phase system, it is advantageous to use a phase separator in which the polymer solution separates from the catalyst phase. The catalyst phase at the bottom is recycled to the reaction as it forms. The top layer in the phase separator contains the target polymer, the hydrocarbon used as solvent, unconverted THF and heteropoly acid in very low concentration, e.g. 10 to 40 ppm. This top layer is then neutralized with a base. Suitable bases are, for example, the hydroxides and carbonates of alkali metals and alkaline earth metals. The unconverted THF and the hydrocarbon are distilled off, and the PTMG which remains is freed from traces of salt by filtration. It is often advisable to subject the polymer to additional decolorizing treatment involving catalytic hydrogenation in contact with a transition metal catalyst.

The production of polyether glycols by our novel process is particularly economical. Surprisingly, the polymers contain only traces of heteropoly acid, so that the process of the invention is a considerably simpler solution than that described in EP-A 181,621, which necessitates the multi-stage purification of polymer solutions contaminated with heteropoly acid. The concentration of heteropoly acid in the polymers obtained in the process of the invention is from 10 to 100 ppm and this is so low that it is not expedient to isolate and recycle said heteropoly acid to the reaction mixture. The costs involved by their loss are negligible and the loss of activity in the polymerization reactor becomes only slightly noticeable after long on-stream periods. For these reasons, the small amount of heteropoly acid dissolved in the polymer can be simply removed by neutralization with a base or by absorption as described in EP-A 0,181,621. The removal of the bulk of the heteropoly acid from the polymerization batch, as described in said EP patent specification, can be dispensed with in the process of the invention.

The polyether glycols produced by the process of the invention are characterized by a very narrow molecular weight distribution. This advantageous result again makes these polymers superior to those obtained by polymerizing THF in the absence of hydrocarbons.

In the following example, the parts and percentages are by weight. The heterogeneity quotient $M_w/M_n$ is described on page 1 of U.S. Pat. No. 4,670,519.

EXAMPLE a) Forming the Catalyst

To 400 parts of tungstophosphoric acid $H_3[PW_{12}O_{40}]$ which has been dehydrated at 150° C. and 0.1 mbar and has a water content of 0.89%, there is carefully added a mixture of 13.6 parts of water and 450 parts of THF at a temperature below 40° C., over a period of 1 hour. The resulting mixture is vigorously stirred for 5 hours at 60° C. The stirrer is then stopped and the two layers which form are separated. There are obtained 181 parts of top layer (polymer phase) and 683 parts of bottom layer (catalyst phase). The top layer has a content of PTMG of 13%. The PTMG has a molecular weight of 2,410 and a heterogeneity quotient ($M_w/M_n$) of 1.8. The content of heteropoly acid in the polymer phase is 4.5%.

b) Polymerization of THF

The bottom layer (catalyst phase) is placed in a polymerization reactor, and 150 parts of THF, 0.75 part of water and 100 parts of cyclohexane are added. Polymerization is carried out with vigorous stirring for 5 hours at 60° C. The first batch provides 258 parts of a top layer having a PTMG content of 37%. The PTMG has a molecular weight of 2,050 and a heterogeneity quotient ($M_w/M_n$) of 1.5. The separated top layer contains about 28 ppm of heteropoly acid. The catalyst phase is returned to the reactor. Ten further polymerization batches are then carried out at 60° C. in the manner described, each involving 150 parts of THF, 0.5 to 0.75 part of water and 100 parts of cyclohexane. The resulting polymers have molecular weights ranging from 1,960 to 2,100. The heterogeneity quotients ($M_w/M_n$) are between 1.4 and 1.5. The amount of heteropoly acid discharged is from 25 to 30 ppm per batch.

The polymerization apparatus is then operated continuously with the following feed rates: 25 parts/h of THF having a water content of 0.43% and 25 parts/h of cyclohexane. A mixture of catalyst phase and polymer phase (containing PTMG, cyclohexane, THF and traces of catalyst) overflows into the phase separator, in which the catalyst phase settles at the bottom. It is recycled to the polymerization reactor at the rate it is obtained. The top layer containing the polymer is withdrawn to the working-up station, where, in a first step, the entrained traces of heteropoly acid are neutralized with dilute (10%) caustic soda solution, after which the polymer solution is freed from solvent in two stages by heating at 180° C. under a pressure of 10 mbar. For the purpose of removing small amounts of salt impurities, the polymer is filtered, for example through a Seitz filter, and the product thus obtained is a pure, very high-grade PTMG having a heterogeneity quotient of 1.4. In a continuous test lasting 72 hours the polytetrahydrofuran is converted to an extent of 32%.

When polymerization is carried out using, in place of cyclohexane, an equal amount of n-heptane, the polymerization results are very much the same. However, the amount of heteropoly acid discharged with the polymer phase is only about 50% of that removed when polymerization is carried out using cyclohexane.

When polymerization is carried out batchwise in the manner described but using, in place of THF, a mixture of 92 parts of THF and 8 parts of propylene oxide, the amount of cyclohexane used remaining the same, the degree of conversion is 30%. The polymer has an average molecular weight of 1,800. a heterogeneity quotient ($M_w/M_n$) of 1.6 and a propylene oxide content of about 30%.

We claim:

1. In a process for the preparation of polyether glycols by polymerization of tetrahydrofuran or copolymerization of tetrahydrofuran with oxiranes, using a heteropoly acid as catalyst, the improvement which comprises:

carrying out the polymerization at a temperature of from 20° to 100° C., under atmospheric or superatmospheric pressure and in the presence of from 20 to 500% w/w of a hydrocarbon, based on the weight of tetrahydrofuran used, said hydrocarbon being selected from the group consisting of aliphatic and cycloaliphatic hydrocarbons of from 5 to 12 carbon atoms and aromatic hydrocarbons of from 6 to 10 carbon atoms.

2. A process as claimed in claim 1, wherein the amount of hydrocarbon used is from 50 to 200% w/w of the amount tetrahydrofuran used.

3. A process as claimed in claim 1, wherein the hydrocarbon used is cyclohexane, n-hexane, n-heptane or n-octane.

4. A process as claimed in claim 1, wherein said process is carried out at a temperature of from 35° to 65° C. under atmospheric pressure.

5. A process as claimed in claim 1, wherein said process is carried out at a temperature of from 35° to 85° C. under superatmospheric pressure.

6. A process as claimed in claim 1, wherein the process is carried out to obtain a polyether glycol product containing a concentration of the heteropoly acid catalyst of about 10 to 100 ppm.

7. A process as claimed in claim 6, wherein the heteropoly acid remaining in the product is removed by neutralization with a base or by absorption.

8. A process as claimed in claim 1, wherein the catalyst contains approximately one to eight molecules of water per molecule of heteropoly acid to give a polyether glycol product having an average molecular weight of from about 1,000 to 3,000.

9. A process as claimed in claim 1, wherein the heteropoly acid catalyst is selected from the group consisting of tungstophosphoric acid, molybdophosphoric acid, molybdosilicic acid and tungstosilicic acid.

* * * * *